United States Patent [19]

Hedges et al.

[11] 4,265,308

[45] May 5, 1981

[54] OIL RECOVERY METHOD USING UNIQUE SALINITY FOR OIL RECOVERY SURFACTANT SYSTEM

[75] Inventors: James H. Hedges; Gilbert R. Glinsmann, both of Bartlesville, Okla.

[73] Assignee: Phillips Petroleum Company, Bartlesville, Okla.

[21] Appl. No.: 71,642

[22] Filed: Aug. 31, 1979

[51] Int. Cl.³ .............................................. E21B 43/22
[52] U.S. Cl. ................................... 166/252; 166/273; 166/274; 252/8.55 D
[58] Field of Search ................... 166/252, 273–275; 252/8.55 D

[56] References Cited

U.S. PATENT DOCUMENTS

| | | | |
|---|---|---|---|
| 3,467,190 | 9/1969 | Dunlap et al. | 166/252 |
| 3,493,048 | 2/1970 | Jones | 166/252 |
| 3,885,628 | 5/1975 | Reed et al. | 166/252 |
| 3,915,230 | 10/1975 | Flournoy et al. | 166/252 |
| 4,066,124 | 1/1978 | Carlin et al. | 166/252 |
| 4,079,785 | 3/1978 | Hessert et al. | 252/8.55 D X |
| 4,122,895 | 10/1978 | Sitton et al. | 166/252 |
| 4,125,156 | 11/1978 | Glinsmann | 166/273 X |

*Primary Examiner*—Stephen J. Novosad

[57] ABSTRACT

A series of surfactant systems is prepared at varying electrolyte concentrations, each system being mixed with oil to be displaced or its equivalent and allowed to equilibrate to determine the salinity at which the microemulsion phase has approximately equal volumes of oil and water; thereafter additional series of such surfactant systems are prepared utilizing different cosurfactants; thereafter the resulting surfactant systems are used at their optimal salinity (i.e., the salinity at which approximately equal volumes of oil and water are taken up into the microemulsion phase) to recover oil from test cores and the resulting oil recovery plotted versus the salinity to give the unique salinity at which maximum oil recovery is obtained for the particular oil-surfactant combination.

17 Claims, 9 Drawing Figures

$V_O$ REPRESENTS THE VOLUME OF OIL TAKEN INTO THE MICROEMULSION PHASE
$V_W$ REPRESENTS THE VOLUME OF WATER TAKEN INTO THE MICROEMULSION PHASE
$V_S$ REPRESENTS THE TOTAL VOLUME OF SURFACTANT AND COSURFACTANT IN THE MICROEMULSION PHASE
$V_\mu$ REPRESENTS THE VOLUME OF THE MICROEMULSION PHASE

TERTIARY OIL RECOVERY VERSUS OPTIMAL SALINITY USING VARIOUS CONCENTRATIONS OF DIFFERENT COSURFACTANTS.

OIL RECOVERY METHOD USING UNIQUE SALINITY FOR OIL RECOVERY SURFACTANT SYSTEM

BACKGROUND OF THE INVENTION

This invention relates to a surfactant system for recovery of oil from a subterranean reservoir.

It has long been known that the primary recovery of oil from a subterranean formation leaves a substantial amount of the oil still in the formation. This has led to the use of what is commonly referred to as secondary recovery or waterflooding wherein a fluid such as brine is injected into a well to force the oil from the pores of the reservoir toward a recovery well. However, this technique also leaves substantial amounts of oil in the reservoir, so-called residual oil, because of the capillary retention of the oil. Accordingly, surfactant systems have been employed either in place of the secondary recovery or more generally in a tertiary recovery process. One particularly suitable type of surfactant system is that which results in the in situ formation of a microemulsion which is immiscible with the oil it is displacing. Such microemulsion systems are very effective in removing residual oil.

The surfactant systems employed to produce microemulsion type oil recovery basically contain at least three separate ingredients, brine, a surfactant and a cosurfactant. It is disclosed in Glinsmann, U.S. Pat. No. 4,125,156, issued Nov. 14, 1978, how to systematically optimize a system so as to give a combination of surfactant, cosurfactant, and brine which produce low interfacial tension which is associated with good oil recovery. Since these values are obtained as disclosed in said Glinsmann patent by plotting oil recovery, interfacial tension and volume fraction of equilibrated phases versus salinity, the salinity at which minimum interfacial tension is achieved has been considered the optimum (optimal) salinity. However, the minimum interfacial tension does not necessarily correlate exactly with maximum oil recovery. Also, different systems with theoretically similar characteristics exhibit drastically different results in practical applications in test cores or actual use.

SUMMARY OF THE INVENTION

It is an object of this invention to systematically produce a system which is more resistant to debilitating effects in the actual reservoir such as surfactant retention and dilution of the cosurfactant; and It is yet a further object of this invention to define a unique salinity which results in a surfactant system inherently more resistant to the debilitating effects of retention and dilution in the actual reservoir.

In accordance with this invention, optimal salinities for surfactant systems having cosurfactants of varying water solubility are determined and the resulting surfactant systems used for actual oil recovery, the actual oil recovery being plotted against the optimal salinity for the given cosurfactant to give a maximum in oil recovery at the unique salinity.

BRIEF DESCRIPTION OF THE DRAWINGS

In the drawings, forming a part hereof.

DESCRIPTION OF THE PREFERRED EMBODIMENTS

Figure 1:
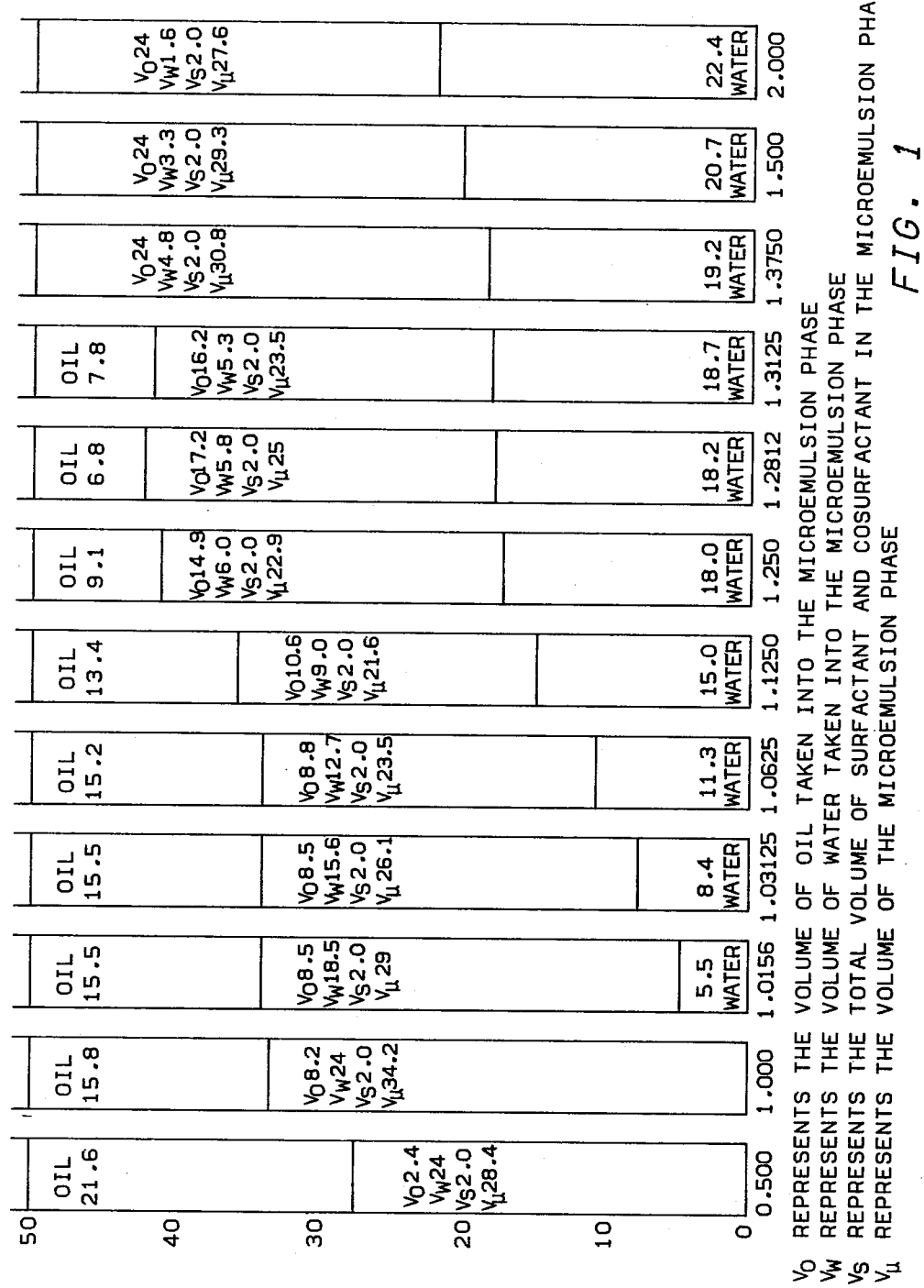
FIG. 1 shows the relationship between the various phases on equilibration of a surfactant system with oil at varying salinities.

In accordance with one aspect of the invention, the unique salinity for an aqueous surfactant-cosurfactant-electrolyte system is determined by the steps of:

(a) preparing a series of aqueous surfactant-cosurfactant-electrolyte systems at varying electrolyte concentrations using a relatively water insoluble cosurfactant, mixing oil to be displaced or its equivalent with the thus produced systems, allowing the resulting mixtures to equilibrate and determining the salinity at which the microemulsion phase formed on said equilibration has approximately equal volumes of oil and water, thus giving the optimal salinity concentration for this surfactant-cosurfactant system;

(b) preparing a series of aqueous surfactant-cosurfactant-electrolyte systems at varying electrolyte concentrations using a relatively water soluble cosurfactant, mixing oil to be displaced or its equivalent with the thus produced systems, allowing the the resulting mixtures to equilibrate and determining the salinity at which the microemulsion phase formed on said equilibration has approximately equal volumes of oil and water, thus giving the optimal salinity concentration for this surfactant-cosurfactant system;

(c) preparing at least one series of surfactant-cosurfactant-electrolyte systems at varying electrolyte concentrations using cosurfactants having a solubility intermediate that of said cosurfactants of (a) and (b), mixing oil to be displaced or its equivalent with the thus produced systems, allowing the resulting mixtures to equilibrate and determining the salinity at which a microemulsion phase formed on said equilibration has approximately equal volumes of oil and water, thus giving the optimal salinity concentration for each surfactant-cosurfactant system;

(d) utilizing said systems of (a), (b) and (c) at optimal salinity to recover oil from a core under the same or similar conditions and plotting the percentage oil thus recovered versus the salinity of each system; and (e) determining from said plot of (d) the unique salinity at which maximum oil recovery is obtained.

Of course, the system of (a) must be arbitrarily chosen so as to have an optimal salinity which is relatively low and the system of (b) chosen so as to have an optimal salinity which is relatively high so as to bracket the unique salinity. This can easily be done by using a cosurfactant having a relatively low water solubility, i.e., isopentanol for the system of (a) and a cosurfactant having a relatively high water solubility such as 2-butanol for the system of (b). Generally, cosurfactants having a water solubility of 0.5 to 5 grams per 100 grams of water at room temperature can be utilized as the relatively water insoluble cosurfactant; and cosurfactants having a water solubility within the range of 10 grams per 100 grams of water at room temperature to infinity can be used for the relatively water soluble cosurfactant. At most, only a small number of experimental tests must be carried out to arrive at a series of surfactant systems having optimal salinities which bracket the unique salinity. Of course, there is no significance to the order in which this is carried out, i.e., the runs utilizing the intermediate solubility cosurfactants could be carried out first, or starting with low solubility cosurfactants and working to higher ones or vice versa can be used. Cosurfactants of intermediate solubility can be viewed as being in either the relatively water soluble or relatively water insoluble category.

The optimal salinity (for steps (a), (b) and (c) above) can be obtained as described in said Glinsmann patent, U.S. Pat. No. 4,125,156, the disclosure of which is incorporated herein by reference. However, this is sufficiently complex that a brief summary is appropriate at this point.

A series of surfactant-cosurfactant-electrolyte-water systems are prepared differing only in salinity. Each of these systems is then mixed with crude oil or a pure hydrocarbon preferably simulating oil from the reservoir to be flooded, for instance, by shaking in a ground glass-stoppered graduated cylinder and allowed to equilibrate. FIG. 1 shows the composition and the volumes of the different phases from a typical series of such equilibrations. Preferably, the surfactant system is mixed with an equal volume of oil so that the point at which equal volumes of oil and water are taken up into the middle microemulsion phase can easily be determined simply by measuring the volume of water remaining below and the volume of oil remaining above. As can be seen from FIG. 1, at very low salinities, a two-phase system is obtained, a lower water rich (so-called gamma type) microemulsion phase in equilibrium with a predominantly oil upper phase. At high salinities, a two-phase system, a lower predominantly water phase in equilibrium with an upper oil rich (so-called alpha type) microemulsion phase is obtained. At the intermediate salinities, both oil and aqueous phases exist in equilibrium with a middle (so-called beta type) microemulsion phase. In general, the minimum interfacial tension is associated with this middle microemulsion phase. In contrast to the behavior shown in FIG. 1, some systems will exhibit behavior wherein the middle phase rather than the upper phase will diminish in volume in the beta to alpha transition region. This in general does not interfere with the optimal salinity determination.

FIG. 2a plots the phase volume systems of FIG. 1 so that they can be represented graphically. FIG. 2b shows a similar plot with the minimum interfacial tensions superimposed on the graph. FIG. 2c shows a similar plot with the oil recovery obtained by utilizing these systems superimposed thereon. As can be seen from FIGS. 2b and 2c, the minimum interfacial tensions and the maximum oil recovery appears to coincide within the three phase region and, as noted hereinabove, it is generally associated with equal volumes of oil and water uptake into the microemulsion.

Thus, the salinity at which the aqueous composition which, when equilibrated with the oil to be displaced, gives approximately equal volumes of oil and water uptake was considered in the prior art to be the best salinity for good oil recovery.

Figure 3:
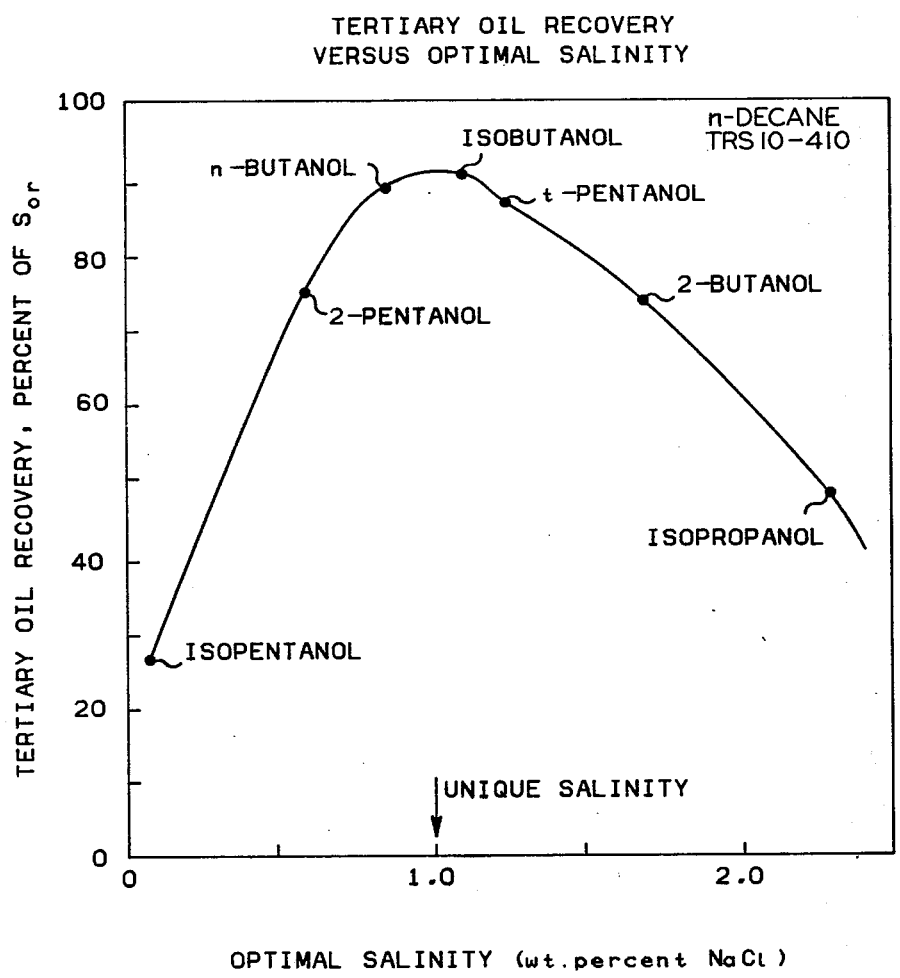
FIG. 3 is a cosurfactant scan plotting the actual oil recovery from core tests versus salinity for a plurality of systems, each of which is used at the optimal salinity for the cosurfactant employed.

FIG. 3 is a plot of oil recovery versus salinity with each of the runs with a different cosurfactant at the optimal salinity for that surfactant system. Thus, for instance, the first point in FIG. 3 utilizing isopentanol as the cosurfactant comes from having made up a series of surfactant systems with isopentanol as the cosurfactant at varying salinities, equilibrating them with oil to be displaced as shown in FIG. 1 and utilizing the aqueous surfactant system which gave equal uptake of oil and water into the middle microemulsion phase, i.e., the one which is at optimal salinity for this surfactant-cosurfactant combination, to displace oil from porous media. The second point is taken using 2-pentanol, again with a series of separate systems being prepared at different salinities and the one utilized in producing the second point on the graph of FIG. 3 being the one which gave optimal salinity in a test such as shown in FIG. 1, and so on for each of the seven cosurfactants. The point at the maximum of the thus produced curve of FIG. 3 then represents the unique salinity. Using the relationship that a more water soluble cosurfactant (or a larger proportion of the water soluble component of a blend of cosurfactants) shifts the optimal salinity to a higher value and a less water soluble cosurfactant (or a larger proportion of the less water soluble component of a blend of cosurfactants) shifts the optimal salinity to a lower value, a cosurfactant can be selected which gives an optimal salinity coinciding or essentially coinciding with the unique salinity.

Figure 4:
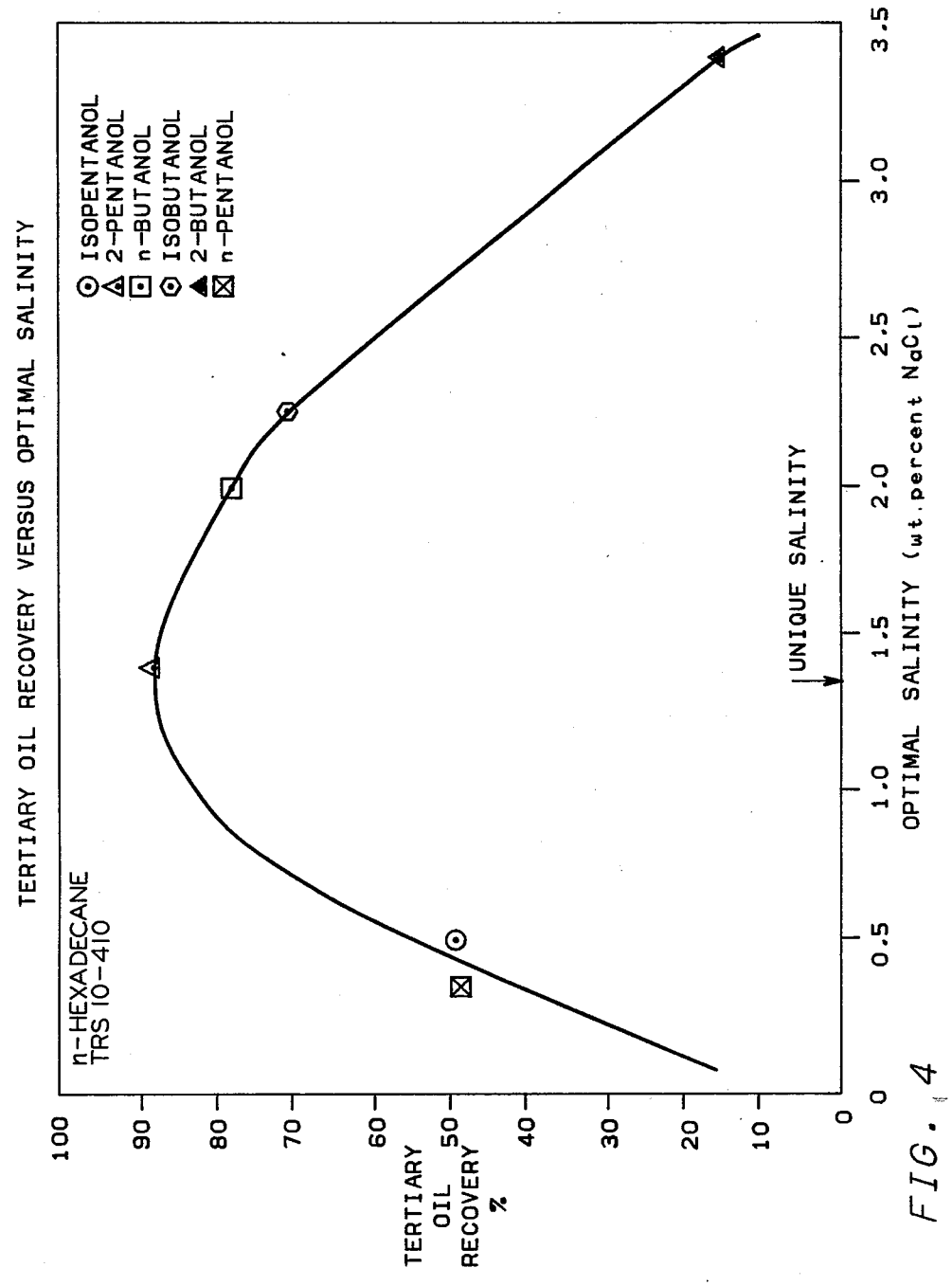
FIG. 4 is a plot similar to FIG. 3 using a different oil.

FIG. 4 is a figure similar to FIG. 3 simply utilizing a different pure hydrocarbon simulating a different oil. The relationship between pure alkane hydrocarbons and complex oil mixtures is described in said Glinsmann patent, U.S. Pat. No. 4,125,156.

Figure 5:
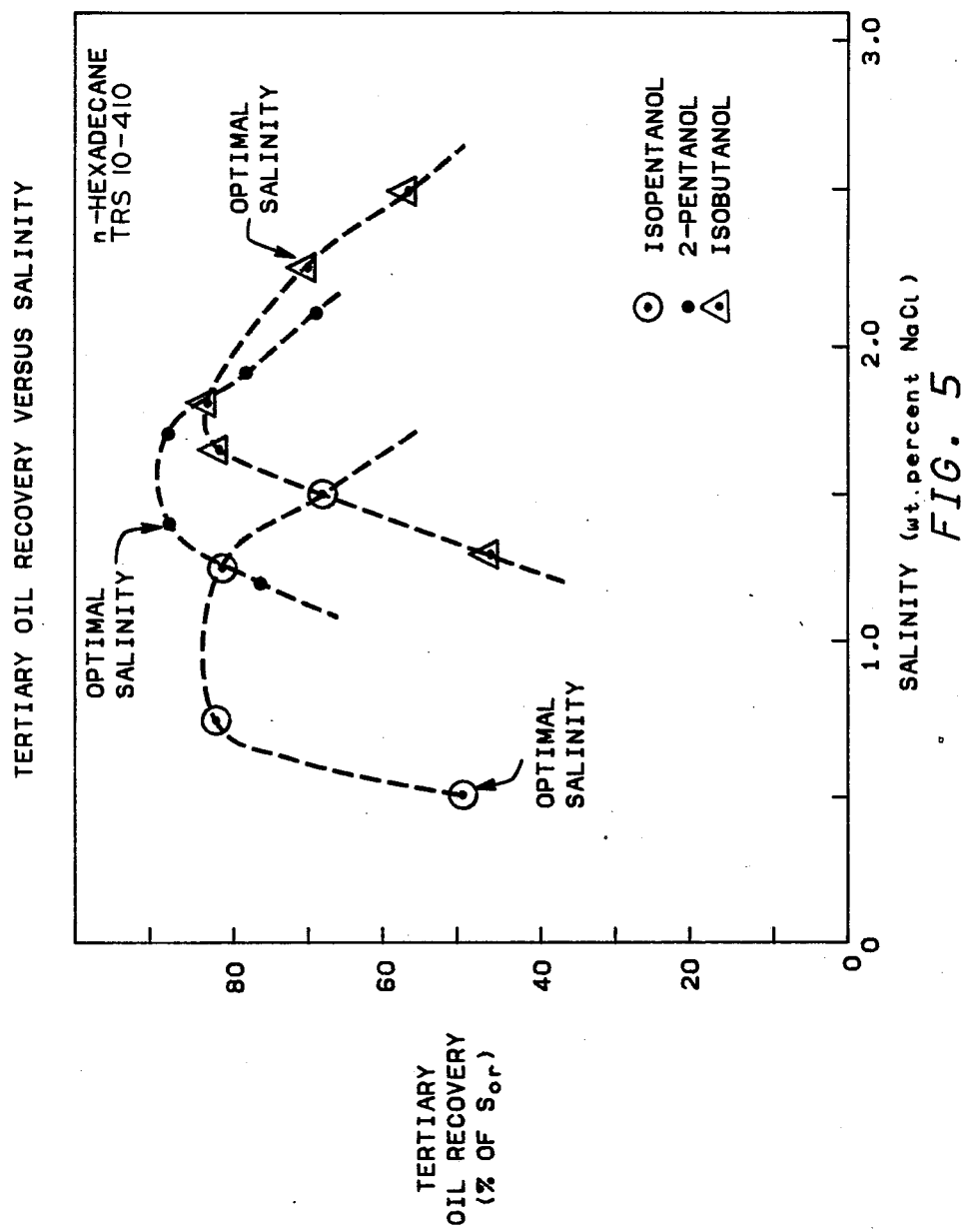
FIG. 5 shows graphically how this invention gives enhanced oil recovery by moving away from the optimal salinity toward the unique salinity in instances where the optimum salinity does not coincide with the unique salinity.

FIG. 5 shows graphically the distinction between the use of optimal salinity to select a surfactant system for a particular application and the use of the unique salinity. The curves show plots of oil recovery versus salinity for three different systems, one utilizing isopentanol, one utilizing isobutanol, and the third utilizing 2-pentanol as the cosurfactant. The surfactant was Witco TRS 10-410 petroleum sulfonate. For each of the three systems, oil recovery with a formulation having optimal salinity is shown. As can be seen with 2-pentanol, the oil recovery falls off on either side of the optimal salinity value. This is because for this specific system, the optimal salinity essentially coincides with the unique salinity. But with both the isopentanol and the isobutanol, enhanced, indeed greatly enhanced, oil recovery is obtained by moving away from the optimal salinity toward the unique salinity, i.e., if this invention is used to direct movement in the correct direction. For instance with isopentanol, oil recovery is increased from about 50 percent to better than about 80 percent by going from the optimal salinity of about 0.50 to a nonoptimal salinity of about 0.75. Similarly, with the isobutanol moving away from the optimal salinity of about 2.4 to a nonoptimal salinity of about 1.75 increased oil recovery dramatically.

This shows graphically that there is a unique salinity for each surfactant-oil combination which cannot be intuitively deduced which is capable of giving drastically enhanced oil recovery as compared with optimized systems of the prior art.

One of the advantages of the unique salinity concept of this invention is the ability to tailor a system more precisely for the particular formation in which it is to be used. For instance, if it is determined in accordance with the invention that the unique salinity with a given surfactant and oil is some particular value, say 1 percent, but the formation in which the oil is located has connate water with a different salinity, then the hydrophobic content of the surfactant can be varied so that both the optimal and the unique salinities are shifted toward the formation salinity. In the case of petroleum sulfonates, increasing the equivalent weight increases the hydrophobic component of the surfactant. However, if the unique salinity cannot be shifted close enough towards the formation salinity, the reservoir should be preflushed to shift the resident brine water salinity toward the unique salinity of the surfactant-oil system.

Figure 6:
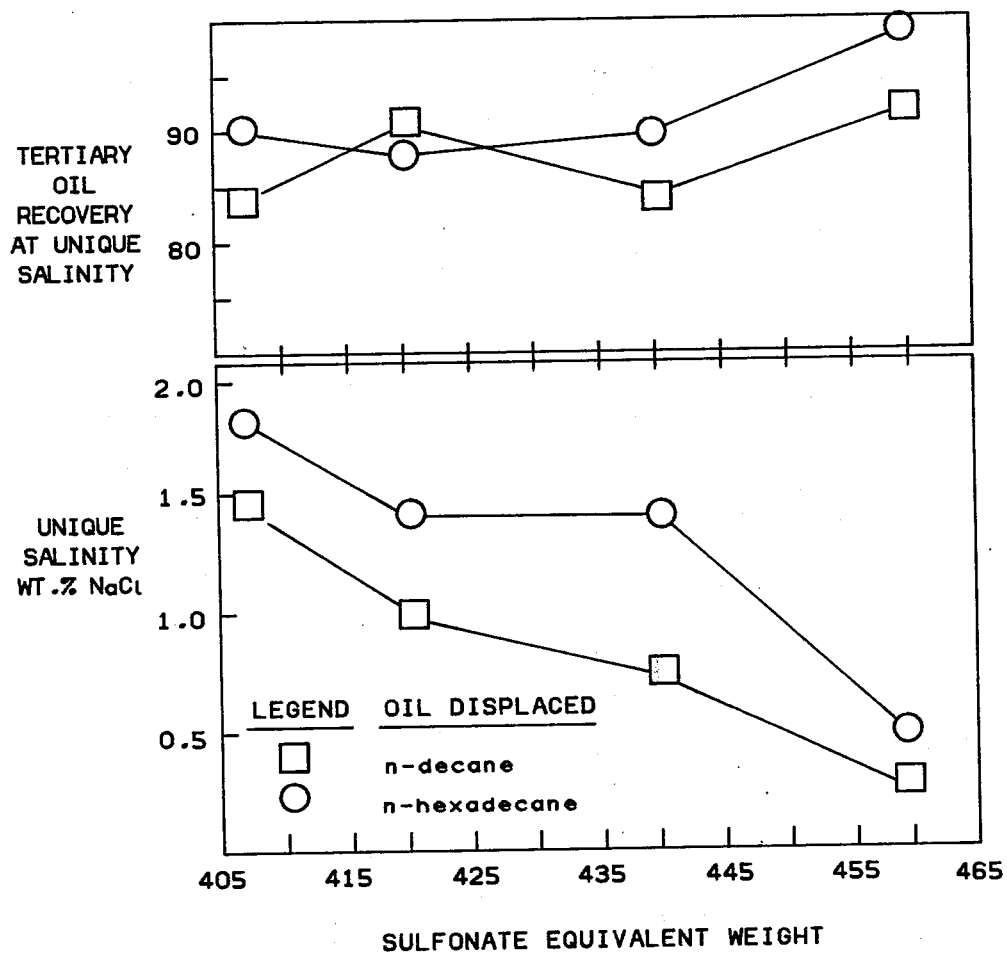
FIG. 6 shows the relationship between unique salinity and sulfonate equivalent weight which provides a basis for formulating a system designed for a given salinity and oil which happens to be in an actual formation.

As can be seen from FIG. 6, for instance, if the initial unique salinity was determined to be 1.0 percent with a sulfonate having an equivalent weight of 420, but the formation has a salinity of only 0.3, then a sulfonate having an equivalent weight of about 460 can be utilized.

The distinction must be maintained between using a cosurfactant of differing water solubility and/or a different concentration thereof to produce a system having an optimal salinity coinciding with the unique salinity on the one hand, and varying the surfactant hydrophobic content on the other hand in order to shift the optimal and unique salinities to a different value.

It is essential to understand that the unique salinity-surfactant-oil combination is not simply an optimization of two variables such that the same results could be obtained by optimizing some other pair of variables. For instance, it is shown in the prior art that the oil recovery can be varied depending on the equivalent weight of the sulfonate used. However, as is shown from FIG. 6, consistently high oil recovery is obtained throughout the rather broad sulfonate equivalent weight range of 405 to 460 so long as the specified surfactant is used with the cosurfactant and at the salinity which provide the unique salinity combination.

Figure 7:
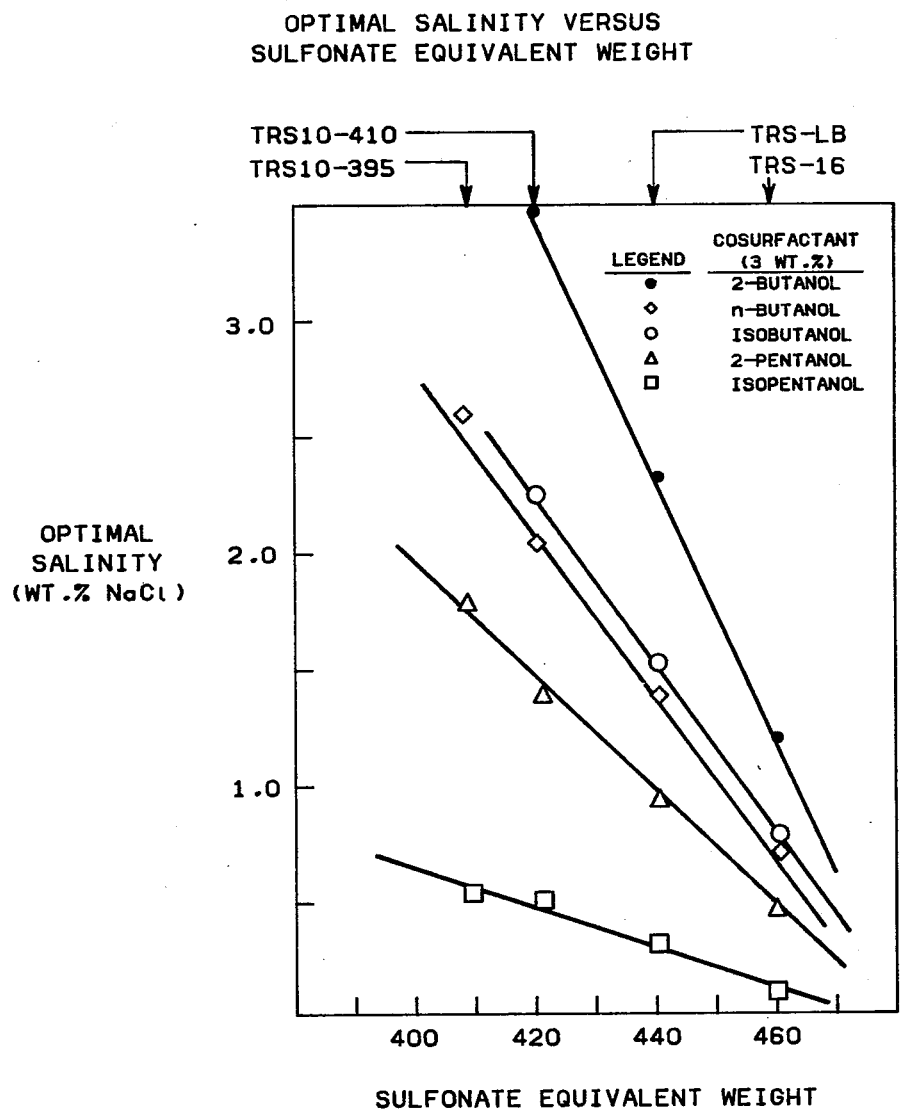
FIG. 7 shows the relationship between optimal salinity and sulfonate equivalent weight.
Figure 8:
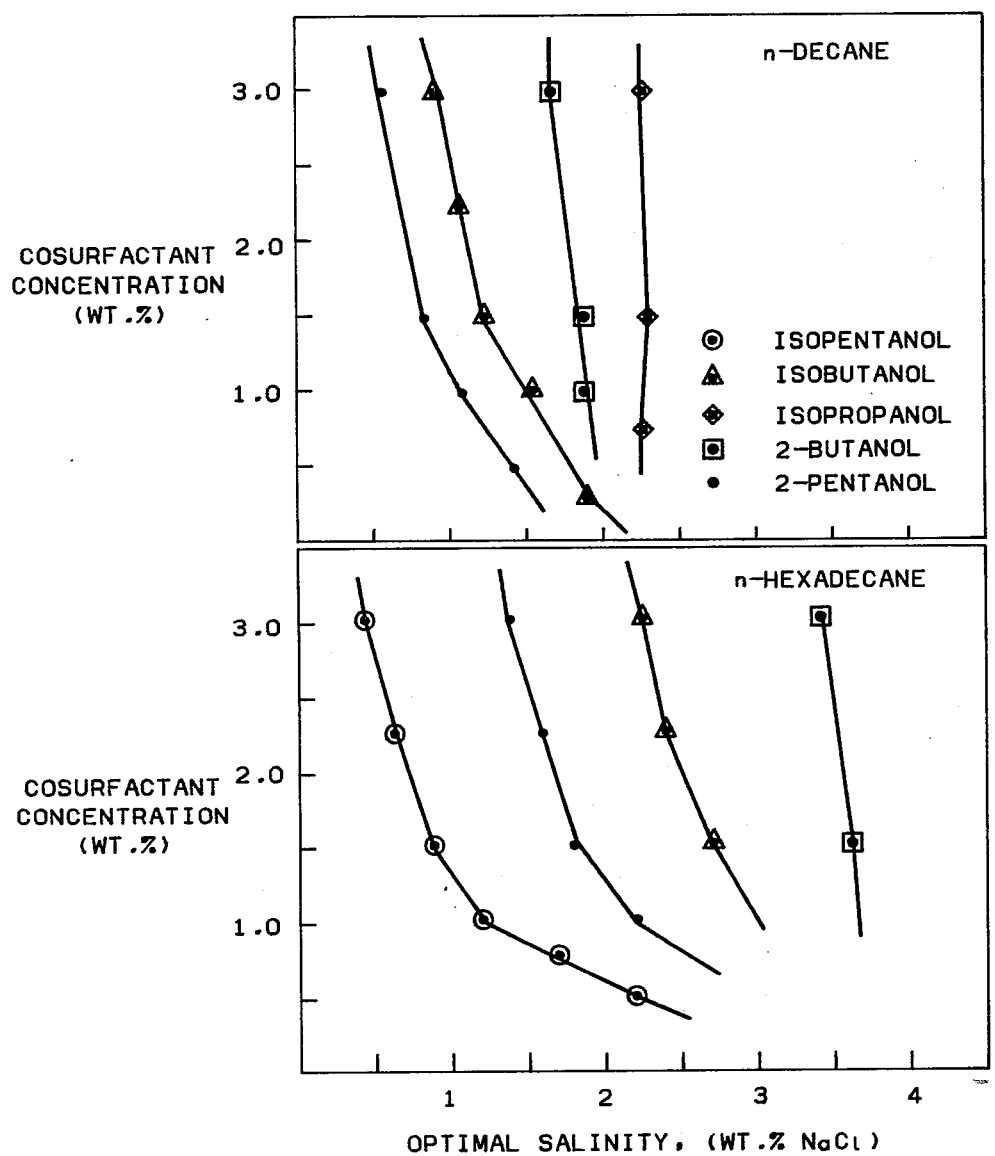
FIG. 8 shows the effect of cosurfactant dilution which can be used to partially explain why there is a unique salinity at which maximum oil recovery is obtained.

While applicants do not wish to be bound by theory, FIGS. 7 and 8 provide some insight into the unique salinity concept. FIG. 7 is a plot of sulfonate equivalent weight versus optimal salinity using various n-hexadecane-surfactant pairs. Viewing, for instance, the 2-butanol curve, the uppermost point represents an optimal salinity of about 3.5 whereas the unique salinity would be about 1.4 for this particular surfactant and oil combination (from other data not included herein). Going down to the lowermost point on the 2-butanol curve, the optimal salinity for a 460 equivalent weight sulfonate is about 1.2 whereas the unique salinity is 0.6 (from other data not included herein). Thus, there is no possible variation in equivalent weight of the sulfonate which will push the system (3 percent 2-butanol cosurfactant and n-hexadecane oil) to an optimal salinity which coincides with the unique salinity at which maximum oil recovery is obtained.

FIG. 8 further shows in part why the unique salinity concept works. It is a fact that as the surfactant system goes through the formation both the surfactant and cosurfactant are likely to be diluted. As can be seen from FIG. 8, dilution has essentially no effect on the optimal salinity for isopropyl alcohol which would seem to be good. However, as can be seen from FIG. 3, isopropyl alcohol is too water soluble to give an optimal salinity anywhere near the unique salinity for the system tested and the same is true for most systems. It turns out that there are two competing factors as dilution occurs. First, optimal salinity shifts to higher salinities when the cosurfactant concentration is decreased (except for very water soluble cosurfactant such as isopropanol). Surfactant retention has the opposite effect of shifting the optimal salinity to lower values. However, the relative effect of the cosurfactant dilution is much more pronounced. As the salinity of the brine in the core and/or in the surfactant system is increased, the retention of surfactant within the core increases (See Table VI). As more of the surfactant is retained within the core, oil recovery will be decreased because smaller volumes of microemulsion are formed. Surprisingly, at the unique salinity, the deleterious effects of cosurfactant dilution and surfactant retention are minimized. Oil recovery decreases at an optimal salinity below the unique value due to cosurfactant dilution, and oil recovery decreases at an optimal salinity above the unique value due to surfactant retention.

Another way to shift optimal salinity to the unique salinity is to use mixtures of cosurfactants.

The surfactant system used in this invention comprises a surfactant, cosurfactant, water, and electrolyte. Such a surfactant system is disclosed in detail in said Glinsmann patent.

Briefly, the applicable surfactants (agents having substantial surface active characteristics) for the surfactant system can include cationic, anionic and nonionic surfactants, and are preferably petroleum sulfonates having an average equivalent weight within the range of 375 to 500, which surfactants are disclosed in more detail in said Glinsmann patent. The surfactant is generally present in an amount within the range of 0.1 to 10, preferably 1 to 7, more preferably 1.5 to 4.5 weight percent based on the weight of the surfactant system.

Briefly, the electrolyte of the surfactant system is preferably a monovalent metallic salt most preferably sodium chloride. The applicable electrolytes are disclosed in detail in said Glinsmann patent. Generally, the electrolyte is present in the water of said surfactant system in an amount so as to give a brine containing 5,000 to 25,000 parts by weight total dissolved solids per million parts by weight of water although this can vary considerably as disclosed in detail in said Glinsmann patent. In instances where a preflush is utilized, the preflush will generally contain a concentration of electrolyte within the same range as that suitable for the surfactant system, i.e., 5,000 to 25,000 parts by weight per million parts by weight of water in said preflush. The same type electrolytes described for the surfactant system are also used in the preflush. Preferably, the preflush has the same electrolyte at about the same concentration as the surfactant system. In field application, electrolyte concentration could be varied by blending varying amounts of a fresh water with a brine.

Cosurfactants (polar solubilizing agents with little or no surface active characteristics) suitable for use in the surfactant system of this invention are as disclosed in said Glinsmann patent. By solubilizing agents is meant agents to solubilize oil and water into the microemulsion. Briefly, these can be esters, amines, aldehydes, ketones, phenols, and the like, such as methyl acetate, ethyl acetate, methyl propionate, ethyl propionate, N,N-diethylamine, isopentylamine, triethylamine, isobutyraldehyde, n-butanal, methyl ethyl ketone, 3-pentanone, p-cresol and phenol. Unsaturated alcohols can also be used in the instant process. Preferred cosurfactants are alcohols containing 1 to 6 carbon atoms, most preferably containing 3 to 5 carbon atoms. Alcohol cosurfactants which can be used either individually or in various blends in the instant process include methanol, ethanol, n-propanol, isopropanol, n-butanol, isobutanol, 2-butanol, tert-butyl alcohol, n-pentanol, 2-pentanol, 3-pentanol, isopentanol, n-hexanol, isohexanol, 2-hexanol, 3-hexanol and the like. Representative alcohol blends which can be used include, e.g., isopropanol/isopentanol, 2-butanol/2-pentanol, isobutanol/n-butanol, n-butanol/2-pentanol, 2-butanol/tert-pentanol, 2-pentanol/isopentanol and other such blends. Alcohols having a solubility of 0.5 to 20 grams per 100 grams of water at room temperature are particularly suitable. Cosurfactants are generally present in an amount within the range of 0.1 to 10 weight percent, preferably 1 to 7, more preferably 1.5 to 4.5 weight percent based on the weight of water in said surfactant system.

There can also be present a cosurfactant in the preflush (if used) and it has been found that such inclusion of a cosurfactant in the preflush unexpectedly further enhances the oil recovery. In such instances, the cosurfactant in the preflush can be the same or different from that in the surfactant system, the same types of cosurfactants being applicable for the preflush as are applicable for the surfactant system and preferably the very same one is used. Similarly, the concentration of cosurfactant in the preflush can be in the same range as the range of cosurfactant in the surfactant system and preferably about the same concentration is used.

Thus, in summary, according to the unique salinity concept, there exists a salinity for any given oil-surfactant pair at which tertiary oil recovery approaches a maximum value. In the instant teaching, unique salinity can be determined for an oil-surfactant pair by the following stepwise process (1, 2, 3) which may be considered a cosurfactant scan procedure for a given surfactant-oil pair:

(1) Optimum salinities of said surfactant systems are derived from phase-volume diagrams based on the phase behavior of equilibrated mixtures of the oil to be displaced and aqueous surfactant systems differing only in the cosurfactant component.

(2) Each of said surfactant systems is used for oil displacements in cores such as Berea cores at the optimum salinity conditions established in (1).

(3) Oil recoveries determined in (2) are plotted, e.g., as ordinate, against salinity using the respective optimal salinities of each surfactant system established in (1) to give a curve exhibiting a maximum oil recovery value corresponding to a salinity herein referred to as the unique salinity for the specified oil-surfactant pair.

As used herein, the optimal salinity referred to in (1), is that salinity at which the water uptake and oil uptake into the middle microemulsion phase is equal for the equilibrated surfactant, oil, water, electrolyte and cosurfactant mixture. At the optimal salinity the corresponding oil-microemulsion and water-microemulsion interfacial tensions are equal and minimal.

EXAMPLE

Optimal salinities (weight percent sodium chloride) were determined for aqueous surfactant systems containing 3 weight percent active Witco TRS 10-410 (a commercially available petroleum sulfonate, see Table I) as the surfactant and various cosurfactant alcohols. As discussed in the previous section, the optimum salinity corresponds to the salinity at which equal solubilization of oil and brine into the middle microemulsion phase occurs with the oil and aqueous surfactant composition equilibrated at constant temperature. The optimal salinities were determined based on equilibration of equal volumes of the aqueous surfactant system and oil of interest. n-Decane and n-hexadecane were used as oils to simulate the relatively low and high range of effective alkane carbon numbers (EACN) for crude oil, i.e., to simulate light and heavy crude.

Based on the predetermined optimal salinities for the surfactant systems containing the various cosurfactants, oil displacement tests were conducted in 3-foot long (3-inch diameter) Berea sandstone cores at the corresponding optimal salinity conditions. Prior to the start of the surfactant flood sequence, the core was (1) saturated with a brine (sodium chloride in distilled water) corresponding to the predetermined optimal salinity for the system of interest, (2) oilflooded with the oil of interest to irreducible water saturation, and (3) waterflooded to an irreducible residual oil saturation. Each core was then subjected to the surfactant slug sequence shown in Table II. In all displacement tests, a 10 percent pore volume aqueous surfactant slug was used which contained 3 weight percent active TRS 10-410 and the corresponding cosurfactant of interest. Sacrificial agents (0.2 weight percent sodium tripolyphosphate plus 0.1 weight percent sodium carbonate) were added to a preflush slug (0.60 pore volume) as well as the surfactant slug to reduce surfactant adsorption loss in porous media. The presence of sacrificial agents is not necessary to determine the unique salinity, although it is preferred to use in laboratory tests the same sacrificial agents that will be used in an actual field operation.

All cosurfactants used in these studies were reagent grade alcohols. n-Decane (99% pure) was supplied by Phillips whereas n-hexadecane (99% pure) was supplied by Humphrey Chemical Company. Sodium tripolyphosphate, sodium carbonate and sodium chloride were analytical grade. All salinities were reported as weight percent sodium chloride. Substantially lower electrolyte concentrations must be used in all cases if divalent ions are present as they exhibit a greater effect as is known in the art.

As noted in Table II, the mobility buffer slug was graded back logarithmically in polymer concentration. This feature along with the relatively low frontal advance (0.6 feet per day) resulted in maximum average pressures across the cores of less than 1 psig per foot provided that a significant amount (about 30 to 40 percent) of the residual oil was displaced. Studies were conducted at 30° C. (86° F.). All cores were rotated continuously at 2.4 revolutions per hour to reduce gravity segregation effects.

For the systems studied, the range of cosurfactant alcohols used included the propanols, butanols and pentanols. Tables IV and V show pertinent data for displacement of n-decane and n-hexadecane, respectively, wherein the tests were conducted using similar aqueous surfactant systems containing the various cosurfactant alcohols at 3 percent concentration. Each test was conducted near the corresponding optimum salinity of the system.

The slight differences between the designated optimal salinity (Table III) and the salinity used (Tables IV and V) in the displacement tests are significant. There is some selectivity of cosurfactants depending on the EACN of the oil. Under the given conditions, maximum recovery of n-hexadecane (EACN=16) was obtained using 2-pentanol whereas maximum recovery of n-decane (EACN=10) was obtained using isobutanol. The specific selectivity cited above is based on 3 weight percent concentration of these cosurfactants.

EACN, the abbreviation for equivalent alkane carbon number, is an inherent characteristic simplified characterization of a given crude oil which allows that oil to be conveniently simulated in a laboratory by a single pure hydrocarbon or mixture of pure hydrocarbons (See said Glinsmann patent).

Figure 2:
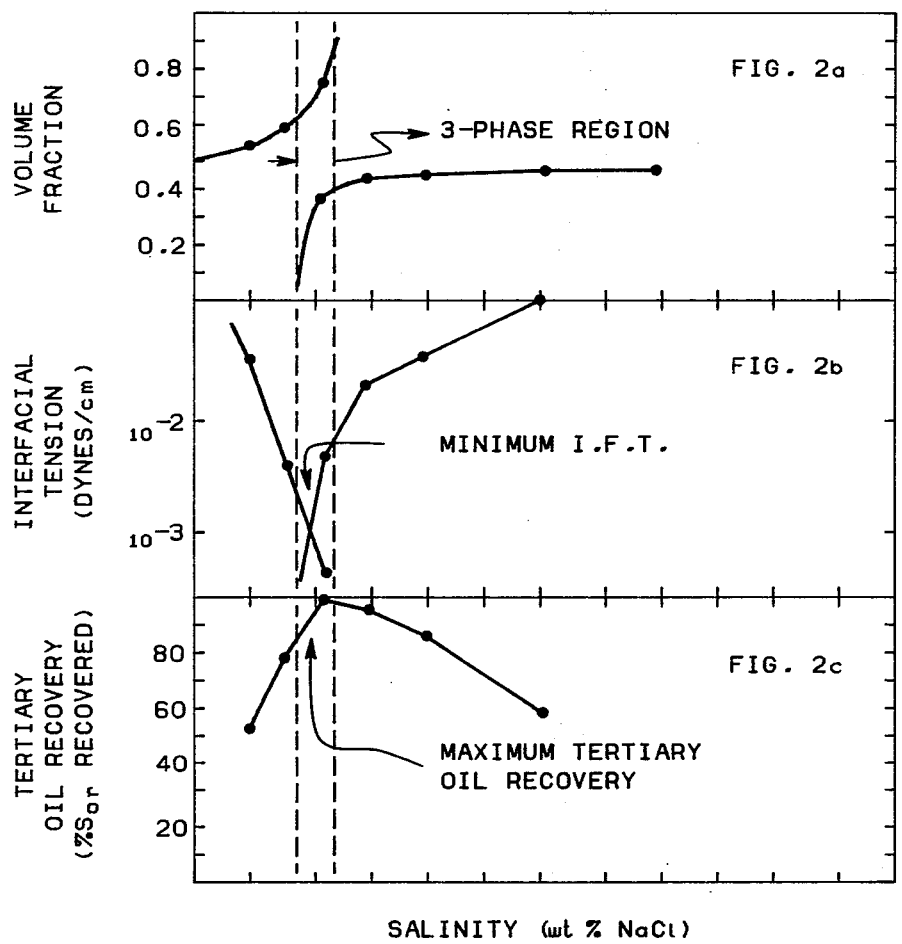
FIG. 2 shows the prior art understanding of the relationships between phase behavior, interfacial tension and maximum oil recovery.

The maximum in oil recovery versus optimal salinity as shown in FIGS. 2 and 3 for variation of cosurfactant type suggests that for a given oil-surfactant pair, there exists a unique salinity at which oil recovery with the optimized systems is maximized. Results indicate that under these conditions, maximum oil recovery is obtained when the cosurfactant is chosen such that the optimal salinity is near the unique salinity.

Figure 9:
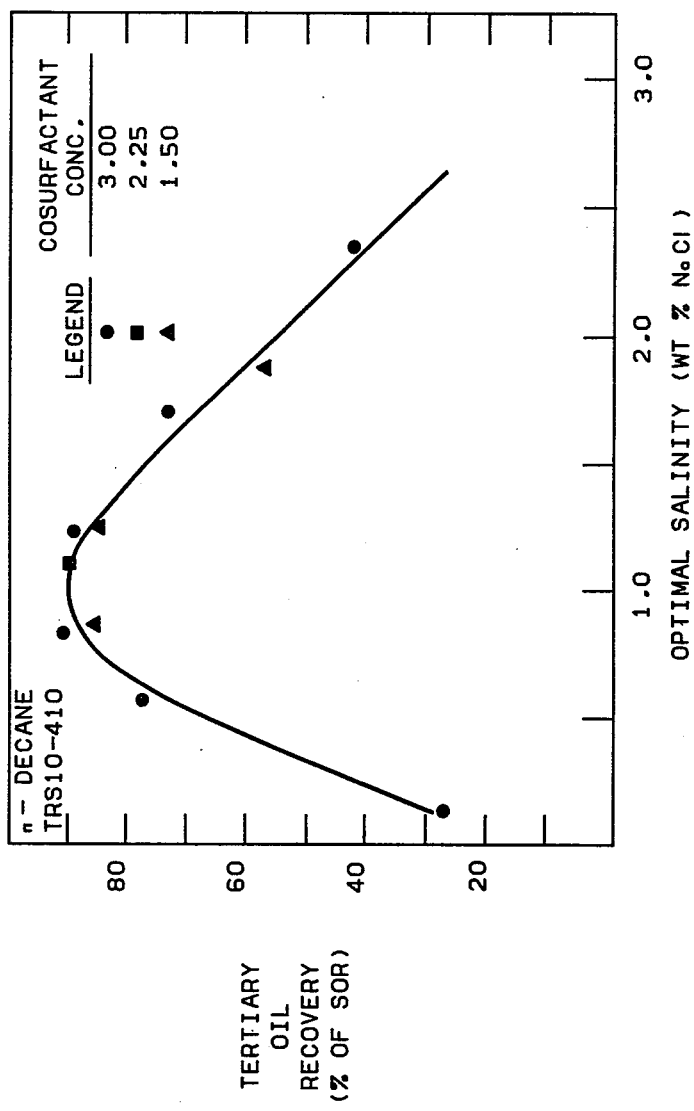
FIG. 9 shows the effect of cosurfactant concentration.

The unique salinity is independent of cosurfactant concentration as shown in FIG. 9 and Table VI where the cosurfactant concentration is varied from 1.5 to 3 percent. Maximum oil recovery occurs at the unique salinity of about 1 percent independent of the cosurfactant concentration. That is, either isobutanol at 2.25 percent or t-pentanol at 3 percent or 2-pentanol at 1.5 percent give an optimal salinity near the unique salinity and hence maximum oil recovery. Thus, decreasing cosurfactant concentration is equivalent to using a more water soluble cosurfactant and changes in either can be used to shift the system toward the unique salinity. As can be seen from FIG. 8, the shift using changes in cosurfactant concentration is effective only when somewhat water-insoluble cosurfactants are used, i.e., those having a solubility in water at room temperature of 10 g or less per 100 g of water. Also shifting the optimal salinity by changes in cosurfactant concentration is most feasible within a concentration of about 1-5 percent.

TABLE I

Properties of WITCO TRS 10-410

| Ingredient | Wt. Percent |
|---|---|
| Active Sodium Sulfonate | 61.5 |
| Oil | 34.0 |
| Water | 4.4 |
| Inorganic Salts | 0.1 |
| Sulfonate Average Equivalent Weight = (Available from Witco Chemical Company) | 420 |

Table II

Slug Sequence for Oil Displacement Tests

Preslug (0.61 PV)
  Contained 0.2% $Na_5P_3O_{10}$+0.1% $Na_2CO_3$ prepared in corresponding optimum salinity brine.
Surfactant Slug (0.10 PV)
  Contained 3% active TRS 10-410+ cosurfactant as indicated +0.2% $Na_5P_3O_{10}$+0.1% $Na_2CO_3$ prepared in corresponding optimum salinity brine.
Mobility Buffer (0.50 PV*)
  Betz Hi-Vis polymer solution prepared in corresponding optimum salinity brine. Polymer concentration was adjusted to yield about 40 centipoise initial viscosity.

*A volume of mobility buffer equal to 0.5 PV was diluted continuously with brine at constant volume; i.e., polymer concentration was graded back logarithmically.

TABLE III

Optimal Salinities for Surfactant Systems Containing 3 Weight Percent of Various Alcohol Cosurfactants Equilibrated with Hydrocarbon Oils at 86° F.

| Cosurfactant Alcohol | Optimum Salinity (a) (Wt. % NaCl) | |
|---|---|---|
| | Oil = n-decane | Oil = n-hexadecane |
| isopropanol | 2.30* | — |
| t-butanol | 1.93 | 3.80 |
| 2-butanol | 1.70* | 3.40* |
| t-pentanol | 1.23* | 2.56 |
| isobutanol | 0.95** | 2.30* |
| n-butanol | 0.82* | 2.00* |
| 2-pentanol | 0.58* | 1.40* |
| isopentanol | 0.10* | 0.46* |
| n-pentanol | — | 0.36* |

(a) Determined as the salinity at which equal volumes of oil and brine were solubilized into the middle microemulsion phase. Equal volumes of oil and aqueous surfactant solution, containing 3 weight percent active TRS 10-410 + 3 percent cosurfactant, were equilibrated at 86° F. All aqueous surfactant systems also contained 0.2% $Na_5P_3O_{10}$ + 0.1% $Na_2CO_3$.
*Denotes systems for which oil displacement tests were conducted. See FIG. 3 for the n-decane results of oil displacement tests and FIG. 4 for n-hexadecane results.
**The actual optimal salinity was 0.95, however, the oil recovery was carried out at a salinity of 1.125 (see Table IV and FIG. 3).

TABLE IV

Pertinent Data for Displacement of n-Decane from 3-foot Berea Cores using 10% PV Surfactant Slugs Containing Various Cosurfactants (See Table II for Slug Sequence and Composition)

| | Test No. | | | | | | |
|---|---|---|---|---|---|---|---|
| | 1 | 2 | 3 | 4 | 5 | 6 | 7 |
| Cosurfactant Type (3 Wt. %) | isopropanol | 2-butanol | t-pentanol | isobutanol | n-butanol | 2-pentanol | isopentanol |
| Optimal Salinity (Wt. % NaCl) | 2.34 | 1.70 | 1.25 | 1.125* | 0.86 | 0.58 | 0.10 |
| Polymer Concentration (ppm) | 2773 | 2600 | 2480 | 2300 | 2250 | 2000 | 1050 |
| Initial Buffer Viscosity (cp) | 36.5 | 38.5 | 41.5 | 40.0 | 42.4 | 43.1 | 44.0 |
| Core Pore Volume (cc) | 857 | 839 | 827 | 838 | 804 | 828 | 824 |
| Initial Oil Saturation, $S_{oi}$(%) | 59.9 | 59.8 | 63.9 | 59.6 | 61.6 | 59.2 | 60.0 |
| Residual Oil Saturation, $S_{or}$(%) | 34.5 | 35.0 | 36.4 | 34.5 | 35.8 | 34.8 | 34.6 |
| Specific Permeability to Brine (md) | 690 | 662 | 659 | 698 | 564 | 670 | 695 |
| Brine Permeability at $S_{or}$ (md) | 61 | 59 | 53 | 64 | 42 | 59 | 63 |
| Tertiary Oil Recovery (% $S_{or}$) | 47.8 | 73.8 | 86.6 | 91.1 | 88.8 | 74.8 | 26.2 |
| Total Oil Recovery (% $S_{oi}$) | 67.5 | 84.6 | 92.4 | 94.8 | 93.5 | 85.2 | 5.5 |
| Final Avg. Oil Saturation (% PV) | 19.5 | 9.19 | 4.89 | 3.08 | 4.02 | 9.84 | 25.5 |
| Sulfonate Retention (active | | | | | | | |

TABLE IV-continued

Pertinent Data for Displacement of n-Decane from 3-foot Berea Cores using 10% PV Surfactant Slugs Containing Various Cosurfactants
(See Table II for Slug Sequence and Composition)

| | Test No. | | | | | | |
|---|---|---|---|---|---|---|---|
| | 1 | 2 | 3 | 4 | 5 | 6 | 7 |
| Cosurfactant Type (3 Wt. %) | isopropanol | 2-butanol | t-pentanol | isobutanol | n-butanol | 2-pentanol | isopentanol |
| lbs/A-ft) | 1610 | 1390 | 1070 | 630 | 1010 | 960 | 570 |

*Close to optimal salinity.

TABLE V

Pertinent Data for Displacement of n-Hexadecane from 3-foot Berea Cores Using 10% PV Surfactant Slugs Containing Various Cosurfactants
(See Table II for Slug Sequence and Composition)

| | Test No. | | | | | |
|---|---|---|---|---|---|---|
| | 8 | 9 | 10 | 11 | 12 | 13 |
| Cosurfactant Type (3 Wt %) | 2-butanol | isobutanol | n-butanol | 2-pentanol | isopentanol | n-pentanol |
| Optimal Salinity (Wt. % NaCl) | 3.40 | 2.25 | 2.04 | 1.40 | 0.50 | 0.35 |
| Polymer Concentration (ppm) | 3150 | 2750 | 2700 | 2530 | 1950 | 1600 |
| Initial Buffer Viscosity (cp) | 41.6 | 43.5 | 34.0 | 40.5 | 41.8 | 43.4 |
| Core Pore Volume (cc) | 828 | 790 | 800 | 838 | 812 | 829 |
| Initial Oil Saturation, $S_{oi}$(%) | 64.1 | 60.5 | 69.4 | 65.3 | 64.7 | 65.3 |
| Residual Oil Saturation, $S_{or}$(%) | 36.9 | 33.8 | 38.6 | 36.9 | 36.9 | 36.6 |
| Specific Permeability to Brine (md) | 656 | 561 | 627 | 689 | 624 | 632 |
| Brine Permeability at $S_{or}$ (md) | 54 | 34 | 41 | 52 | 47 | 53 |
| Tertiary Oil Recovery (% $S_{or}$) | 15.6 | 69.6 | 77.8 | 88.0 | 49.7 | 49.9 |
| Total Oil Recovery (% $S_{oi}$) | 52.6 | 83.0 | 87.6 | 93.2 | 71.3 | 71.9 |
| Final Avg. Oil Saturation (% PV) | 31.1 | 10.3 | 8.6 | 4.44 | 18.5 | 18.3 |
| Sulfonate Retention (active lbs/A-ft) | 1630 | 1120 | 1060 | 340 | 580 | 570 |

TABLE VI

Displacement Data in Berea Sandstone Cores Using n-Decane Oil and Witco TRS 10-410 Petroleum Sulfonate

| Cosurfactant Type | Cosurfactant Concentration (Wt. %) | Optimal Salinity (Wt. % NaCl) | $S_{oi}$ (%) | $S_{or}$ (%) | $T_{or}$ (% of $S_{or}$) | Sulfonate Retention (lb/acre-ft) |
|---|---|---|---|---|---|---|
| Isopropanol | 3.0 | 2.34 | 59.9 | 34.5 | 47.8 | 1610 (590)* |
| 2-Butanol | 3.0 | 1.70 | 59.8 | 35.0 | 73.8 | 1390 (510) |
| 2-Butanol | 1.5 | 1.86 | 60.5 | 35.3 | 58.8 | 1230 (450) |
| t-Pentanol | 3.0 | 1.25 | 63.9 | 36.4 | 86.6 | 1070 (390) |
| Isobutanol | 2.25 | 1.125 | 59.7 | 35.2 | 87.9 | 1090 (400) |
| Isobutanol | 1.5 | 1.25 | 65.0 | 35.9 | 84.6 | 1280 (470) |
| n-Butanol | 3.0 | 0.86 | 61.6 | 35.8 | 88.8 | 1010 (370) |
| 2-Pentanol | 3.0 | 0.58 | 59.2 | 34.8 | 74.8 | 960 (350) |
| 2-Pentanol | 1.5 | 0.88 | 61.4 | 35.9 | 84.9 | 1130 (420) |
| Isopentanol | 3.0 | 0.10 | 60.0 | 34.6 | 26.2 | 570 (210) |

*g/m³

While this invention is described in detail for the purpose of illustration, it is not to be construed as limited thereby but is intended to cover all changes and modifications within the spirit and scope thereof.

We claim:

1. A method for determining the unique salinity for an aqueous surfactant-cosurfactant-electrolyte system comprising:

(a) preparing a series of aqueous surfactant-cosurfactant-electrolyte systems at varying electrolyte concentrations using a relatively water insoluble cosurfactant, mixing oil to be displaced or its equivalent with the thus produced systems, allowing the resulting mixtures to equilibrate and determining the salinity at which the microemulsion phase formed on said equilibration has approximately equal volumes of oil and water thus giving the optimal salinity concentration for this surfactant-cosurfactant combination;

(b) preparing a series of aqueous surfactant-cosurfactant-electrolyte systems at varying electrolyte concentrations using a relatively water soluble cosurfactant or a lower cosurfactant concentration than that of (a), mixing oil to be displaced or its equivalent with the thus produced systems, allowing the resulting mixtures to equilibrate and determining the salinity at which the microemulsion phase formed on said equilibration has approximately equal volumes of oil and water, thus giving the optimal salinity concentration for this surfactant-cosurfactant combination;

(c) preparing at least one series of surfactant-cosurfactant-electrolyte systems at varying electrolyte concentrations using cosurfactants having a solubility or concentration intermediate that of said cosurfactants of (a) and (b), mixing oil to be displaced or its equivalent with the thus produced systems, allowing the resulting mixture to equilibrate and determining the salinity at which a microemulsion phase formed on said equilibration has approximately equal volumes of oil and water, thus giving the optimal salinity concentration for each surfactant-cosurfactant combination;

(d) utilizing said systems of (a), (b) and (c) at optimal salinity to recover oil from a core and plotting the percentage oil thus recovered versus the salinity of each system; and (e) determining from said plot of (d) the unique salinity at which maximum oil recovery is obtained.

2. A method according to claim 1 comprising in addition preparing a surfactant system having an optimal salinity at or near the unique salinity, utilizing the relationship that with increasing water solubility of the cosurfactant, the optimal salinity increases and with decreasing water solubility of the cosurfactant, the optimal salinity decreases.

3. A method according to claim 1 wherein said relatively water insoluble cosurfactant has a water solubility within the range of 0.5 to 5 grams per 100 grams of water at room temperature and said relatively water soluble cosurfactant has a water solubility within the range of 10 grams per 100 grams of water to infinite solubility at room temperature.

4. A method according to claim 1 wherein said electrolyte comprises sodium chloride.

5. A method according to claim 1 wherein said surfactant comprises a petroleum sulfonate.

6. A method according to claim 1 wherein said surfactant consists essentially of a petroleum sulfonate having an average equivalent weight within the range of 375 to 500.

7. A method according to claim 1 wherein said cosurfactant is present in said aqueous surfactant-cosurfactant-electrolyte systems in an amount within the range of 1 to 7 weight percent based on the weight of said systems, and said surfactant is present in an amount within the range of 1 to 7 weight percent based on the weight of said systems.

8. A method according to claim 7 wherein said cosurfactants are alcohols, said surfactant is a petroleum sulfonate having an average equivalent weight within the range of 375 to 500, and said electrolyte comprises sodium chloride.

9. A method according to claim 1 comprising in addition preparing a surfactant system using a cosurfactant having a water solubility no greater than 10 g per 100 g of water at room temperature, having an optimal salinity at or near the unique salinity using the relationship that decreasing the cosurfactant concentration increases the optimal salinity.

10. A process for recovering oil from a subterranean oil-bearing reservoir comprising the steps of:

(1) injecting into said reservoir a surfactant system at or near unique salinity corresponding to one prepared by:

(a) preparing a series of aqueous surfactant-cosurfactant-electrolyte systems at varying electrolyte concentrations using a relatively water insoluble cosurfactant, mixing oil corresponding to that in said oil-bearing reservoir with the thus produced systems, allowing the resulting mixtures to equilibrate and determining the salinity at which the microemulsion phase formed on said equilibration has approximately equal volumes of oil and water, thus giving the optimal salinity concentration for this surfactant-cosurfactant combination;

(b) preparing a second series of aqueous surfactant-cosurfactant-electrolyte systems at varying electrolyte concentrations using a relatively water soluble cosurfactant, mixing said oil corresponding to said oil in said reservoir with the thus produced systems, allowing the resulting mixtures to equilibrate and determining the salinity at which the microemulsion phase formed on said equilibration has approximately equal volumes of oil and water, thus giving the optimum salinity concentration for this surfactant-cosurfactant combination;

(c) preparing at least one series of aqueous surfactant-cosurfactant-electrolyte systems using a cosurfactant having a water solubility intermediate that of said first and second cosurfactants, mixing said oil corresponding to said oil in said reservoir with the thus produced systems, allowing the resulting mixtures to equilibrate and determining the salinity at which the microemulsion phase formed on said equilibration has approximately equal volumes of oil and water, thus giving the optimum salinity concentration for each surfactant-cosurfactant combination;

(d) utilizing said systems of (a), (b) and (c) at optimal salinity to remove oil from a core and plotting the percentage oil recovered versus the salinity of each system;

(e) determining from said plot of (d) the unique salinity at which maximum oil recovery is obtained;

(f) preparing said surfactant system having an optimum salinity at or near said unique salinity of (e) for said injecting utilizing at least one of the relationships that:

(i) the optimal salinity increases with increasing water solubility of said cosurfactant and decreases with decreasing water solubility of said cosurfactant; and (ii) with cosurfactants having a water solubility no greater than 10 g per 100 grams of water at room temperature, the optimal salinity increases with decreasing cosurfactant concentration and decreases with increasing cosurfactant concentration.

(2) thereafter injecting a drive fluid into said reservoir and forcing said oil towards at least one recovery well; and (3) recovering said oil.

11. A method according to claim 10 wherein said electrolyte comprises sodium chloride, said surfactant comprises a petroleum sulfonate having an average equivalent weight within the range of 375 to 500, said cosurfactants are alcohols, said surfactant is present in said surfactant-cosurfactant-electrolyte systems in a concentration within the range of 1 to 7 weight percent based on the weight of said systems and said cosurfactant is present in said systems in a concentration within the range of 1 to 7 weight percent based on the weight of said system.

12. A method for recovering oil from an oil-bearing reservoir comprising the steps of:

(a) injecting into said reservoir through at least one injection well an aqueous surfactant system comprising water, electrolyte, surfactant and cosurfactant which system has an optimal salinity at or near a unique salinity for the surfactant-oil combination, said optimal salinity being the salinity concentration at which a microemulsion phase having approximately equal volumes of oil and water forms on mixing the reservoir oil or equivalent with a surfactant system, said unique salinity being the salinity concentration at which maximum oil recovery is obtained for the reservoir oil or equivalent-surfactant combination obtained by the proper selection of the cosurfactant and cosurfactant concentration;

(b) thereafter injecting a drive fluid, thus forcing said oil toward at least one recovery well; and (c) recovering said oil.

13. A process for recovering oil from an oil-bearing reservoir comprising the steps of:
   (a) preparing a first surfactant-cosurfactant-electrolyte-water system having an optimal salinity essentially corresponding to a unique salinity thereof, said optimal salinity being the salinity concentration at which a microemulsion phase having approximately equal volumes of oil and water forms on mixing the reservoir oil or equivalent with a surfactant system, said unique salinity being the salinity concentration at which maximum oil recovery is obtained for the reservoir oil or equivalent-surfactant combination obtained by the proper selection of the cosurfactant and cosurfactant concentration;
   (b) preparing a second surfactant system having the unique salinity changed from that of said system of (a) toward that of connate water in said oil-bearing reservoir using the relationship that with decreasing surfactant hydrophobic content, the unique salinity is increased and with increasing surfactant hydrophobic content, the unique salinity is decreased;
   (c) injecting said surfactant system of (b) into said reservoir;
   (d) thereafter injecting a drive fluid, thus forcing said oil toward at least one recovery well; and
   (e) recovering said oil.

14. A method according to claim 13 wherein said electrolyte comprises sodium chloride, said surfactant comprises a petroleum sulfonate having an average equivalent weight within the range of 375 to 500, said cosurfactants are alcohols, said surfactant is present in said surfactant-cosurfactant-electrolyte systems in a concentration within the range of 1 to 7 weight percent based on the weight of water in said systems and said cosurfactant is present in said systems in a concentration within the range of 1 to 7 weight percent based on the weight of said water in said systems.

15. A method according to claim 14 wherein said connate water has a higher salinity than the unique salinity of said surfactant system of (a) and said surfactant system of (b) is prepared by utilizing a lower equivalent weight sulfonate.

16. A method according to claim 14 wherein said connate water has a lower salinity than said unique salinity of said surfactant system of (a) and said surfactant system of (b) is prepared by utilizing a petroleum sulfonate having a higher equivalent weight.

17. A process for recovering oil from an oil-bearing reservoir comprising the steps of:
   (a) preparing a surfactant-cosurfactant-electrolyte-water system having an optimal salinity essentially corresponding to a unique salinity thereof, said optimal salinity being the salinity concentration at which a microemulsion phase having approximately equal volumes of oil and water forms on mixing the reservoir oil or equivalent with a surfactant system, said unique salinity being the salinity concentration at which maximum oil recovery is obtained for the reservoir oil or equivalent-surfactant combination obtained by the proper selection of the cosurfactant and cosurfactant concentration;
   (b) injecting a preflush into said reservoir to shift the connate water salinity toward the unique salinity of the surfactant system of (a);
   (c) injecting said surfactant system of (a) into said reservoir;
   (d) thereafter injecting a drive fluid, thus forcing said oil toward at least one recovery well; and
   (e) recovering said oil.

* * * * *